United States Patent
Pedersen et al.

(10) Patent No.: US 7,650,154 B2
(45) Date of Patent: Jan. 19, 2010

(54) ADAPTIVE RESERVATION OF CHANNELIZATION CODES AND ALLOWED POWER

(75) Inventors: Klaus Ingemann Pedersen, Aalborg (DK); Jeroen Wigard, Klärup (DK); Preben Mogensen, Gistrup (DK)

(73) Assignee: Nokia Corporation, Espoo (FI)

( * ) Notice: Subject to any disclaimer, the term of this patent is extended or adjusted under 35 U.S.C. 154(b) by 761 days.

(21) Appl. No.: 10/517,448

(22) PCT Filed: Jun. 13, 2002

(86) PCT No.: PCT/IB02/02181

§ 371 (c)(1),
(2), (4) Date: Dec. 9, 2004

(87) PCT Pub. No.: WO03/107707

PCT Pub. Date: Dec. 24, 2003

(65) Prior Publication Data

US 2005/0226267 A1     Oct. 13, 2005

(51) Int. Cl.
*H04W 72/00* (2009.01)
(52) U.S. Cl. .................................. 455/453; 370/335
(58) Field of Classification Search .............. 370/335, 370/320, 342, 441; 455/451, 452.1, 453
See application file for complete search history.

(56) References Cited

U.S. PATENT DOCUMENTS

| | | | | |
|---|---|---|---|---|
| 5,138,311 A | * | 8/1992 | Weinberg | 340/7.28 |
| 6,078,817 A | * | 6/2000 | Rahman | 455/452.1 |
| 6,144,861 A | * | 11/2000 | Sundelin et al. | 455/522 |
| 6,163,524 A | * | 12/2000 | Magnusson et al. | 370/208 |
| 6,542,736 B1 | * | 4/2003 | Parkvall et al. | 455/452.2 |
| 6,859,446 B1 | * | 2/2005 | Gopalakrishnan et al. | 370/335 |
| 7,006,464 B1 | * | 2/2006 | Gopalakrishnan et al. | 370/328 |
| 7,027,420 B2 | * | 4/2006 | Hamalainen | 370/335 |
| 7,039,092 B1 | * | 5/2006 | Cao et al. | 375/140 |
| 2002/0009061 A1 | * | 1/2002 | Willenegger | 370/328 |
| 2002/0010001 A1 | * | 1/2002 | Dahlman et al. | 455/522 |
| 2002/0089952 A1 | * | 7/2002 | Cao et al. | 370/335 |
| 2002/0110101 A1 | * | 8/2002 | Gopalakrishnan et al. | 370/335 |

(Continued)

FOREIGN PATENT DOCUMENTS

EP     1 035 676 A1    9/2000

(Continued)

OTHER PUBLICATIONS

Sung et al; "A Quality-Based Fixed-Step Power Control Algorithm with Adaptive Target Threshold"; Jul. 2000; IEEE Transactions on Vehicular Technology, vol. 49, No. 4, pp. 1430-1439.*

(Continued)

*Primary Examiner*—Andrew Caldwell
*Assistant Examiner*—Jeffrey Nickerson
(74) *Attorney, Agent, or Firm*—Alston & Bird LLP

(57) ABSTRACT

The invention provides a method, system, and network entity for adaptive setting or reservation of channelization codes and/or power for downlink channel in a communication network, in particular for DSCH and HS-DSCH, using parameters (PtxDSCHallowed, SFmin) for minimum allowed Spreading Factor, SF, and/or allowed power level, the parameters being set depending on the traffic load, the total cell load and/or the availability of channelization codes.

19 Claims, 4 Drawing Sheets

U.S. PATENT DOCUMENTS

| | | | |
|---|---|---|---|
| 2002/0160781 A1* | 10/2002 | Bark et al. | 455/450 |
| 2003/0043774 A1* | 3/2003 | Hamalainen et al. | 370/342 |
| 2003/0123382 A1* | 7/2003 | Wang et al. | 370/208 |
| 2003/0231586 A1* | 12/2003 | Chheda | 370/230 |

FOREIGN PATENT DOCUMENTS

| | | |
|---|---|---|
| EP | 1 209 936 A1 | 5/2002 |
| WO | WO 99/52226 * | 10/1999 |
| WO | WO 01/39540 A1 * | 5/2001 |
| WO | WO 02/45291 A1 | 6/2002 |

OTHER PUBLICATIONS

3GPP TR 25.922; 3rd Generation Partnership Project, Technical Specification Group Access Network, Radio Resource Management Strategies; Mar. 2002; Sophia Antipolis—FR; v5.0.0 (Release 5).*

3GPP TS 25.223; 3rd Generation Partnership Project, Technical Specification Group Radio Access Network, Speading and Modulation (TDD); Mar. 2002; Sophia Antipolis—FR; v5.0.0 (Release 5).*

3GPP TS 25.225; 3rd Generation Partnership Project, Technical Specification Group Radio Access Network, Physical Layer Measurements (TDD); Mar. 2002; Sophia Antipolis—FR; v5.0.0 (Release 5).*

3GPP; "Technical Specification Group Radio Access Network, High Speed Downlink Packet Access (HSDPA), Overall Description"; Mar. 2002; Stage 2, Release 5; 3GPP.org; pp. 1-20.*

Tseng et al; "Code Placement and Replacement Strategies for Wideband CDMA OVSF Code Tree Management"; Proc. of IEEE GLOBECOM; vol. 1; 2001; pp. 562-566.*

Chen et al; "A Novel Code Assignment Scheme for W-CDMA Systems"; 2001; Proc. of IEEE 2001 Vehicular Technology Conference, vol. 2; pp. 1182-1186.*

Minn et al; "Dynamic Assignment of Orthogonal Variable-Spreading-Factor Codes in W-CDMA"; Aug. 2000; IEEE Journal on Selected Areas in Communications, vol. 18, No. 8; pp. 1429-1440.*

Borgonovo et al, "Packet service in UMTS: delay-throughput performance of the downlinke shared channel", Computer Networks, Jan. 15, 2002, ElSevier, Netherlands, vol. 38, No. 1, pp. 43-59, XP002230031.

* cited by examiner

DSCH code allocation policy.

Example of allocated bit rates and Tx power for the DSCH.

Example of allocated bit rates and Tx power for the DSCH.

Examples of the DSCH behaviour before and after adjustment of the reserved Tx power level.

Illustration of territory regions for DSCH/HSDPA code allocation schemes.

ADAPTIVE RESERVATION OF CHANNELIZATION CODES AND ALLOWED POWER

FIELD AND BACKGROUND OF THE INVENTION

The invention generally relates to adaptive reservation of channelization codes and/or power for downlink, preferably for the DSCH (downlink shared channel) and/or the HS-DSCH (high speed downlink shared channel) which is part of the HSDPA (High Speed Downlink Packet Access) concept.

The downlink shared channel (DSCH) in UTRAN (Universal Terrestrial PAN (Radio Access Network)) is a packet channel which is time shared by multiple users. The DSCH may be mapped to one or multiple PDSCHs (Physical Downlink Shared Channels) having a spreading factor between 4 and 256. The DSCH offers high data-rates and fast scheduling with bit rate modification every 10 ms, which makes it attractive for bursty packet applications such as web browsing, etc. The HS-DSCH can be regarded as an enhanced DSCH which offers bit rate modification every 2 ms as well as adaptive modulation and coding. The HS-DSCH is mapped to HS-PDSCH (high speed physical downlink shared channel).

In order to facilitate fast bit rate modification, a certain set of channelization codes is usually reserved for each DSCH as illustrated in FIG. 1. This means that time delays due to release and setup of new codes can be avoided. However, this is done at the expense of potentially wasting part of the limited code resources when the PDSCH is using the higher spreading factors. It was therefore of advantage when the reserved codes are adjusted adaptively according to traffic load in the cell, among others.

Link Adaptation (LA) techniques are commonly used for control (i.e. bit rate selection) of the DSCH. LA aims at minimizing the transmit power variations of the PDSCHs by transmitting with lower bit rates to UEs (User Equipments) which are far from the BS (Base Station) compared to those close to the BS. The selected bit rate for each UE can be expressed as a function of the power allowed for the PDSCH and the associated DPCH ($P_{txPDSCHAllowed}$ & $P_{txDPCH}$), the planned EbNo's for the channels ($\rho_{PDSCH}$ & $\rho_{DPCH}$), and the bit rate of the associated DPCH ($R_{DCH}$) (DPCH=Dedicated Physical Channel). According to the LA criteria, the bit rate to be allocated a user is therefore expressed as $$R_{DSCH,LA} = \text{Round}\left\{ \frac{P_{txPDSCHAllowed}\rho_{DPCH}}{P_{txDPCH}\rho_{PDSCH}} R_{DCH} \right\} \quad (1)$$

where Round{ } denotes truncation to the nearest possible bit rate. That can e.g. be 32 kbps, 64 kbps, etc., depending on the reserved channelization codes. Knowledge of $P_{txDPCH}$ is obtained through average measurements.

Provided that there are sufficient data to be transmitted on the PBSCH, the LA algorithm will automatically result in the following property:

$$E\{P_{txPDSCH}\} \cong P_{txPDSCHAllowed}, \quad (2)$$

where the mathematical operator E{ } takes the expectation over time. If the relation in equation (2) is false, then it indicates that the DSCH is being poorly exploited. Various reasons for this could be that too much power has been reserved for the PDSCH under the given traffic load or that channelization code blocking is occurring, where the intended LA bit rates according to equation (1) are limited by the minimum allowed spreading factor, i.e. $R_{DSCH} < R_{DSCH,LA}$. Even though equation (2) is valid, there might still be room for optimization by allowing a larger fraction of power to be reserved for the PDSCH. Effective utilization of the DSCH by using LA does therefore depend on the settings of $P_{txDSCHAllowed}$ and the spreading factor of the root channelization code, $SF_{min}$.

SUMMARY OF THE INVENTION

It is an object of the present invention to provide for adaptive setting or reservation of channelization codes and/or power for the downlink, e.g. DSCH and HS-DSCH.

According to the present invention this object is achieved by a method according to any of the independent method claims and/or a system according to any of the independent system claims.

The invention provides a system, method, and network entity, for adaptive reservation of channelization codes and/or power, preferably for DSCH and HS-DSCH.

According to one aspect, a method, system, and/or network entity are provided for adaptive setting or reservation of channelization codes and/or power for downlink channel in a communication network, in particular for DSCH and HS-DSCH, using parameters ($P_{txDSCHAllowed}$, $SF_{min}$) for minimum allowed Spreading Factor, SF, and/or allowed power level, the parameters being set depending on the traffic load, the total cell load and/or the availability of channelization codes.

The adaptive setting or reservation of codes and/or power is conducted per logical cell. There is no coordination between setting or reservation of codes and/or power resources from one cell to another.

It is one of the advantages of the invention that the reserved codes are adjusted adaptively according to traffic load in the cell, among others.

The presented algorithm opens for effective utilization of the DSCH when using link adaptation techniques, as well as the HS-DSCH. Especially for cases where the BS carries a mixture of RT (Real Time) and NRT (Non Real Time) users, which are mapped to different channel types, such as FACH (Forward Access Channel), DCH (Dedicated Channel), DSCH (Downlink Shared Channel), and HS-DSCH (High Speed Downlink Shared Channel). The algorithm optimizes the usage of both code and power resources. This will in general result in a capacity gain or improved quality in terms of lower queuing times for NRT user, less blocking/dropping, etc.

As mentioned above, the algorithm provides a gain in terms of increased system capacity and/or quality for cells using the DSCH and/or HS-DSCH.

The presented algorithm opens for effective utilization of the DSCH when using link adaptation techniques as well as the HS-DSCH. The invention discloses a method for adaptive adjustment of root spreading factor and DSCH power. The adaptation is preferably based on three kinds of measurements:

1. The average transmitted power P_txDSCHest of the PDSCH,
2. The relative activity factor A of the PDSCH,
3. The weighted code blocking rate B.

The invention also presents a territory method for channelization code allocation. The following definitions of code territories is introduced:
Dedicated DSCH capacity
Default DSCH capacity
Additional DSCH capacity
Further features and advantages of the present invention are defined in the following.

BRIEF DESCRIPTION OF PREFERRED EMBODIMENTS OF THE INVENTION

Figure 1:
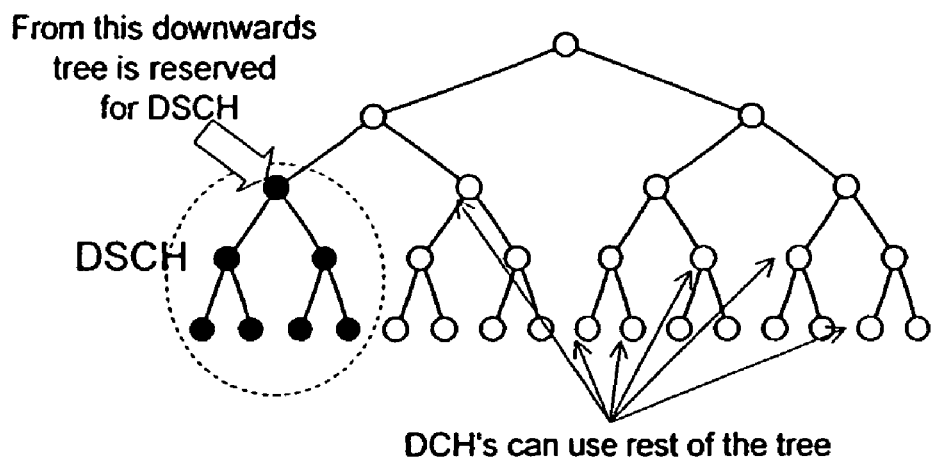
FIG. 1 shows a schematic block diagram illustrating DSCH code allocation policy in an embodiment of the present invention.

As mentioned above, effective utilization of the DSCH by using LA depends on the settings of $P_{txDSCHallowed}$ and the spreading factor of the root channelization code, $SF_{min}$. The present invention provides adaptive algorithms for adjustment of these parameters.

Once it has been decided which spreading factor the root code should have, the next task is to determine which node in the tree to reserve. An algorithm for this part is also disclosed herein. This algorithm is basically based on a dynamic territory partition of the code tree, which is derived to avoid situations where the code tree becomes highly fragmented. Using this approach, a trunking efficient solution is provided for typical scenarios where the code tree is shared between user equipments (UEs) on DCH, DSCH, FACH, etc.

The HS-DSCH specified within 3GPP, as part of the HSDPA concept, also requires adaptive algorithms for reservation of code resources as well as power levels. This is basically due to the fact that it is assumed within 3GPP, that the HS-DSCH is operated with constant power, i.e. no power control.

The constant HS-DSCH power level should, however, be periodically adaptively adjusted according to load conditions in the cell as well as other factors. The algorithm specified in the present invention is therefore equally applicable to HS-DSCH. This applies also for cases where the code resources for the HS-DSCH is changed dynamically in order to facilitate variable bit rates and for cases where varying number of multi codes are applied.

In the following, the adaptive adjustment of root spreading factor and DSCH power will be described. The optimum setting of the two parameters ($P_{txDSCHallowed}$ and $SF_{min}$) depends on the traffic load as well as the total cell load (measured by power) and the availability of channelization codes. These factors are all considered to be time-variant, which leads to the conclusion that $P_{txDSCHallowed}$ and $SF_{min}$ preferably are adaptively adjusted in order to optimize the overall cell performance. It is proposed here to base the adaptation on three kinds of measurements, seen over a certain observation period. These measurements are:1) the average transmitted power of the PDSCH, $P_{txDscHest}$.

2) the relative activity factor A of the PDSCH. The activity factor A, equals zero if the PDSCH is silent during the observation and 0.5 if the DSCH is active 50% of the time with the observation period. Hence, A ranges from 0 to 1;

3) the weighted code-blocking rate, B. This factor is defined as the relative time during the observation period, where a larger bit rate could have been allocated to a UE according to the LA criteria in equation (1) compared to the actually assigned bit rate when taking the minimum allowed SF into account. Hence, B ranges from 0 to 1. If B=0, then it indicates that at no time during the observation period did it occur that the minimum allowed SF was too high.

In order to further underline the meaning of these measures, let us consider two examples.

Figure 2:
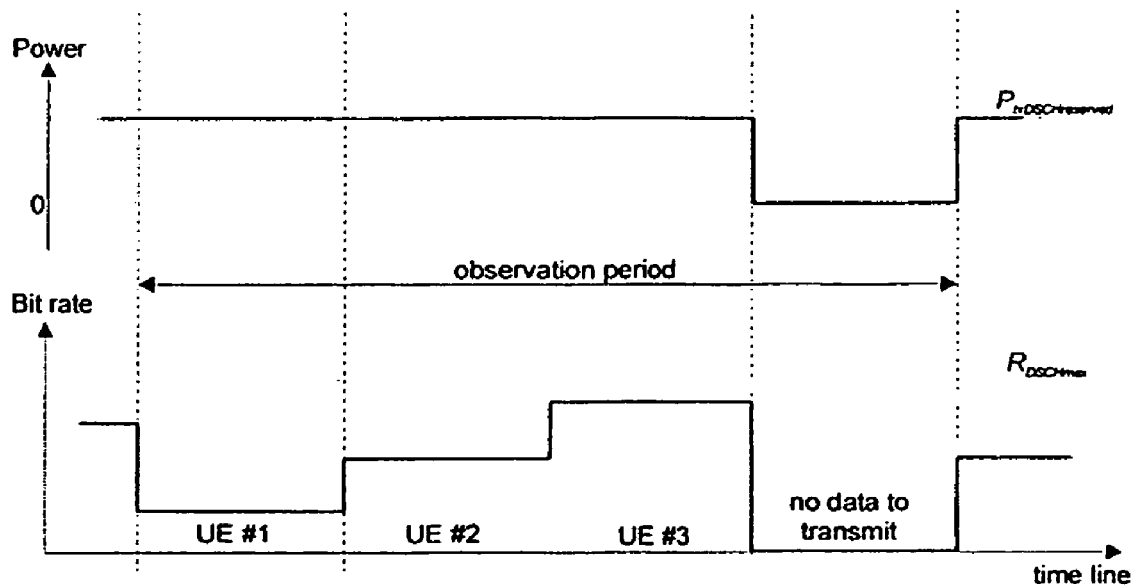
FIG. 2 illustrates an example of allocated bit rates and Tx power for the DSCH in an embodiment of the invention.

FIG. 2 shows an example where three different UEs have been transmitted on the PDSCH during the observation period. UE #3 is apparently located close to the BS, since it has the highest bit rate. UE #1 is far from the BS, since it has been allocated a relative low bit rate. During the last scheduling window in the observation period, there are no data available for transmission on the DSCH. This gap in the transmission is typically too short for dedicated channels to be scheduled during this period, i.e. some capacity is wasted.

For this particular case, we have A=0.75, B=0 ($R_{DSCHmax}$ is not exceeded), and $P_{txDsCHest}$=0.75$P_{txDSCHallowed}$.

Figure 3:
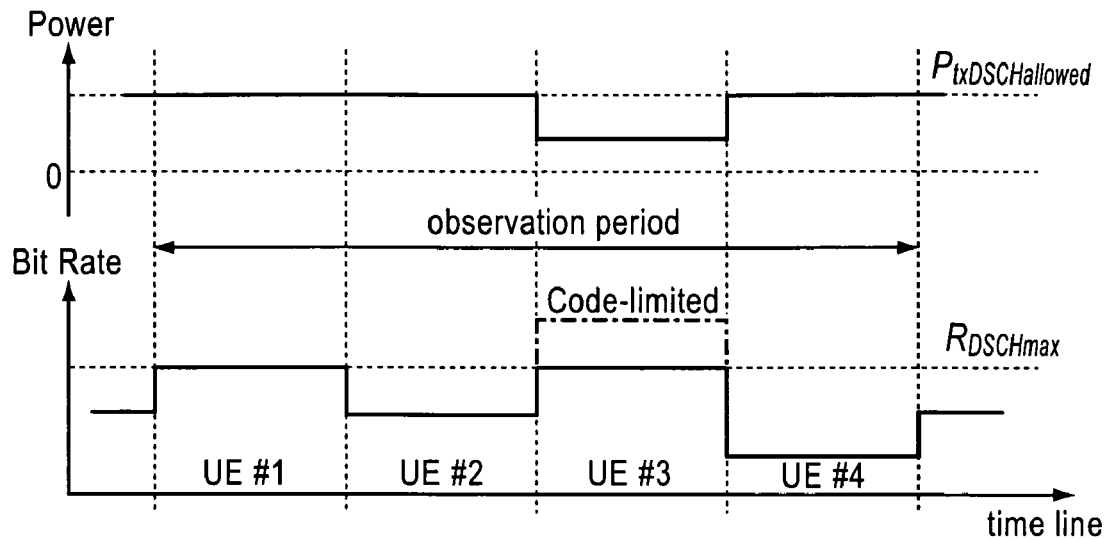
FIG. 3 shows another example of allocated bit rates and Tx power for the DSCH in an embodiment of the invention.

FIG. 3 presents another case, where UE #3 actually could have been allocated a higher bit rate according to the LA criteria (1), but a lower bit rate was allocated according to the minimum allowed SF. The lower bit rate for UE #3, automatically results in a lower average Tx power during the period where UE #3 is receiving data. This is not desirable according to the LA criteria expressed in (2), i.e. a lower minimum SF should be reserved (if possible).

For this particular case, we have A=1.0, B=0,25 (25% of the time a higher bit rate could have been assigned), and $P_{txDSCHest}<P_{txDSCHallowed}$.

Based on these examples, four simplified criterias are proposed for adjustment of the allowed power level and the minimum allowed SF.

If A is smaller than $TH_{A1}$, and $P_{txDSCHest}$ is smaller than $P_{txpDSCHallowed}$ minus a certain defined or set value (e.g. threshold value)×(A<$TH_{A1}$ and $P_{txDSCHest}<(P_{txPDSCallowed}-X)$), then decrease the reserved power, preferably by the value X, or a fraction thereof.

The reason is that when the activity on the DSCH is too low to keep it almost constant busy, one option is to reduce the reserved power level, which automatically will result in smaller assigned bit rates and therefore also longer transmit times, i.e. a higher activity on the channel. This is obvious from equation (1). The threshold parameter $TH_A$ which lies between 0 and 1 and X are strongly related. Assuming that the offered traffic is identical in two consecutive observation periods, it can be shown that setting $TH_A=10^{\wedge}(-XdB/10)$ results in fulfillment of equation (2) in the following observation period provided that A≅$TH_A$ in the previous period.

If A is greater than $TH_{A2}$, and $P_{txDSCHest}$ is greater than $P_{txPDSCHallowed}$ minus the value X (A>$TH_{A2}$ and $P_{txDSCHest}>P_{txPDSCHallowed}-X$), then increase the allowed power, preferably by X.

The reason for this is that only when there is constant high activity on the DSCH (e.g. $TH_{A2}$=0.9) and the power level is close to or higher than the reserved value, it makes sense to increase the reserved power level. If the activity factor is lower than unity, it implicitly indicates that there are no packets in the queue, i.e. no need for increased power (capacity).

However, before we increase the reserved power level, we must of course consider the total power level in the cell in order to avoid saturation or clipping in the downlink power amplifier (PA).

If B is greater than $TH_B$, and A is greater than $TH_{A2}$ ($B>TH_B$ and $A>TH_{A2}$), then decrease $SF_{min}$ (allowing higher bit rates):The reason herefore is that if it happens more than a certain fraction of the observation period ($TH_B \in [0;1]$), that higher bit rates than $R_{DSCHmax}$ are requested according to the LA criteria in equation (1) and the DSCH is constantly busy, then one should try to increase $R_{DSCHmax}$, i.e. decrease $SF_{min}$ with a factor of two. However, one should only perform this action if A is close to unity. If $A<<1$, then it indicates that the DSCH is not constantly busy so a better solution to the problem is probably to lower the reserved power level, i.e. this would reduce the likelihood of code blocking events and help in fulfillment of equation (2).

If B equals zero, and $L_{code}$ is greater than $TH_{code}$ (B=0 and $L_{code}>TH_{code}$), then increase $SF_{min}$ (max bit rate is decreased).

The reason herefore is that for cases where code limitation problems are absent some of the reserved channelization codes are preferably released by increasing $SF_{min}$ with a factor of two. This helps to reduce the likelihood of code blocking for DPCHs. However, it only makes sense to increase $SF_{min}$ if there is a potential need for additional channelization codes. Hence, the action is only performed if $L_{code}>TH_{code}$, meaning if the code tree is already heavily loaded. Here $TH_{code}$ is a threshold parameter and $L_{code}$ is the current load of the code tree obtained from the resource manager (RM).

Figure 4:
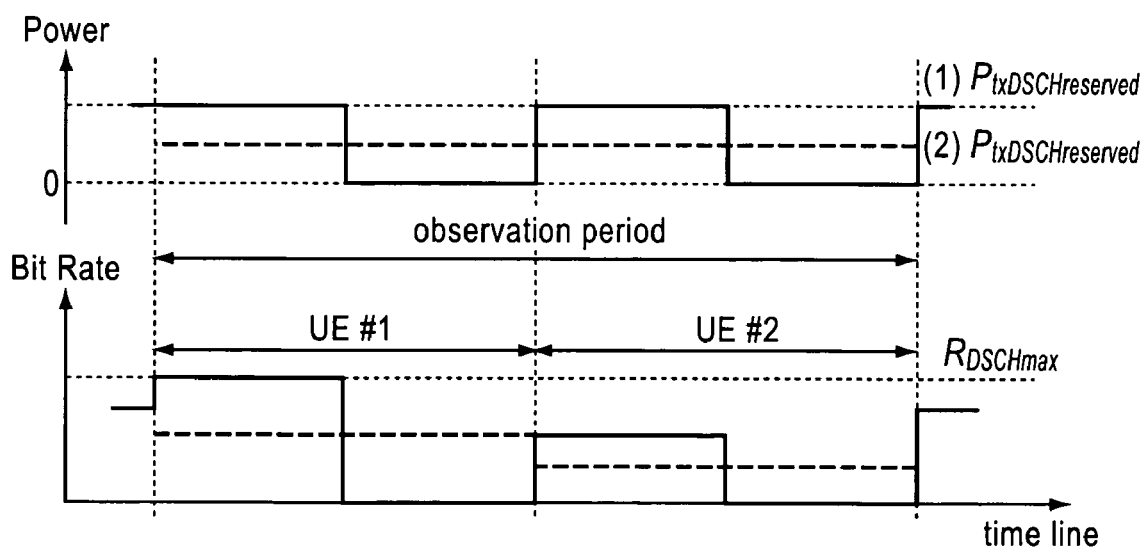
FIG. 4 illustrates further examples of the DSCH behavior before and after adjustment of the reserved Tx power level in an embodiment of the invention.

The effect of the criteria for reducing the reserved power level is illustrated in FIG. 4. The solid curves correspond to the high reserved power level, while the dashed curve corresponds to the reserved power level after the adjustment. The current example correspond to the case where A=0.5 and $P_{txDSCHest}=0.5P_{DSCHreserved}$ prior to adjustment, and X=3 dB. For this particular case, as well as for other cases, the problem is obviously solved by reducing the power.

The HS-DSCH also benefits from adaptive algorithms for reservation of code resources as well as power levels. The algorithm specified in the present invention is equally applicable the HS-DSCH. Both for cases where the code resources for the HS-DSCH is changed dynamically in order to facilitate variable bit rates.

With regard to "territory method" for channelization code allocation: Once it has been decided to reserve a new root PDSCH code with a given SF, the next step is to decide where in the code tree this reservation is to be made. As an example, it is assumed that a code with SF=8 should be reserved. For that particular case there might actually be on the order of 1-6 available nodes (codes) in the tree. If one just randomly selects a node in the tree, one eventually reaches a situation where the code-tree becomes highly fragmented and difficult to manage as new users are being admitted and dropped (due to ended calls).

In order to avoid such situations, a generic method is proposed here where different strategies for code assignment are used depending on the channel type (say DCH, DSCH, FACH, etc). This method will be called "the territory method" in the sequel.

Figure 5:
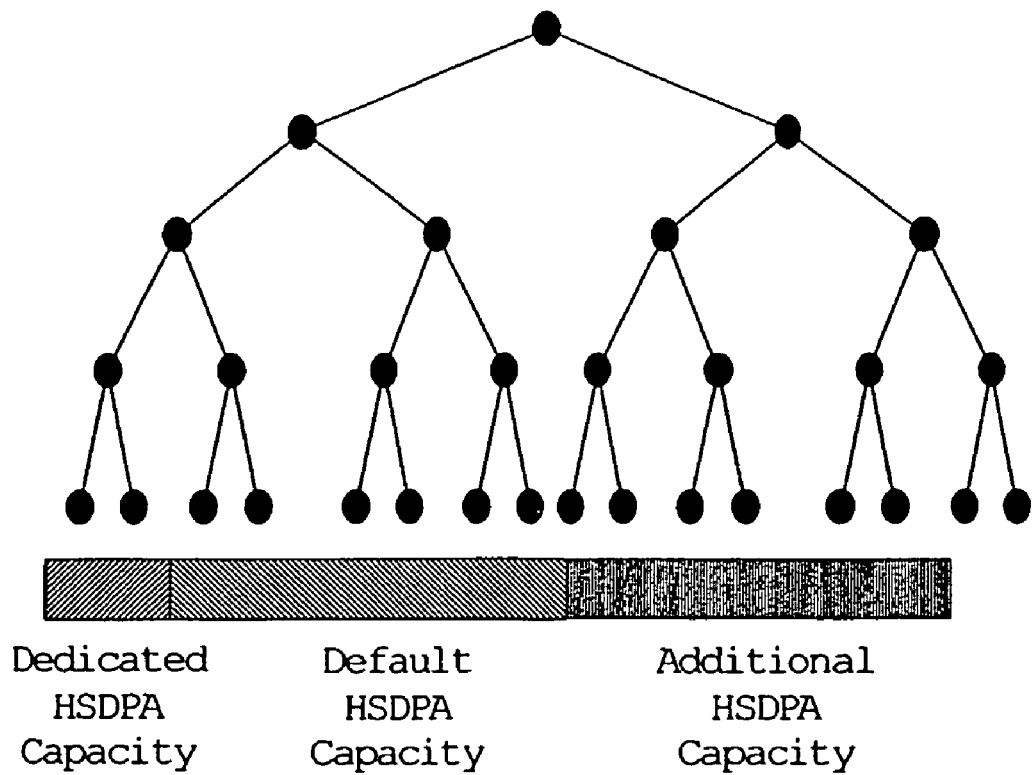
FIG. 5 shows an illustration of territory regions for DSCH/HS-DSCH code allocation schemes according to embodiments of the invention.

The basic principle for the method is illustrated in FIG. 5, where codes for DSCH (HS-DSCH) basically are assigned in the tree starting from the left according to FIG. 5, or more generally starting from a certain limb of the code tree. Hence, codes assigned for DCH users should primarily be done in the right part of the code tree according to the illustration of FIG. 5, or more generally starting from another limb, different from the certain limb, of the code tree. In order to describe the method the following definitions of code territories are introduced:

Dedicated DSCH Capacity: In cases where a maximum SF for the DSCH always should be reserved (i.e. guaranteed minimum bit rate), part of the tree is reserved for DSCH and HS-DSCH. The codes in this part of the tree cannot be used for other users, say DCH.

Default DSCH Capacity: The default capacity is always allocated to DSCH territory (to be used by HS-DSCH and DSCH) when the total code tree load allows this. This is basically what is expressed in above sections in particular relating to adaptive adjustment of root spreading factor and DSCH power, for the criteria for increase of $SF_{min}$. Here the SF is only increased if the code tree is highly loaded.

Additional DSCH Capacity: When the default capacity is allocated to the DSCH territory, additional code resources might be needed if the DSCH is highly loaded. The upgrade to a lower SF is done by including part of the codes in the "additional DSCH territory" region, provided that free codes are available. Once the traffic load on the DSCH start to decline and the criteria for increase of SFmin in the above sections relating to adaptive adjustment of root spreading factor and DSCH power is triggered, the additional DSCH territory is downgraded.

The part of the code tree which is used by DSCH (HS-DSCH) is called DSCH_territory. At the start this is set equal to the default DSCH territory, whereafter the DSCH-territory is dynamically updated, based on the load in the different parts of the tree and the criterias listed in the above sections related to adaptive adjustment of root spreading factor and DSCH power.

The dedicated DSCH capacity can be used to always guarantee some part of the tree for DSCH (HS-DSCH) users, so they get some service even though the rest of the network for example is occupied by real time users.

The additional DSCH capacity can be set to the whole tree, but some part of the tree can be kept out of the additional territory. Advantage of this is that when other users are placed in this part, then they have not to be replaced, when the DSCH territory is to be increased. For this increase it may be necessary to reallocate the RT users in parts of the tree, which belong to the additional territory.

Approximate parameter settings corresponding to best mode of algorithm are: $TH_{A1}=0.5$, $TH_{A2}=0.9$, $TH_B=0.1$, and $TH_{code}=0.8$. These settings will result in an effective and robust algorithm. However, depending on the actual system configuration there might of course be room for optimization of these parameter settings.

One of the preferred methods for operation of the DSCH is to use LA. If LA is applied, adaptive allocation of code and power resources are required in order to ensure effective utilization of the DSCH.

The current working assumption within 3GPP is to operate the HS-DSCH channel with constant power. A robust algorithm for adaptive adjustment of the power level as well as reserved code resources are therefore provided by the invention for optimum management of the HS-DSCH.

Figure 6:
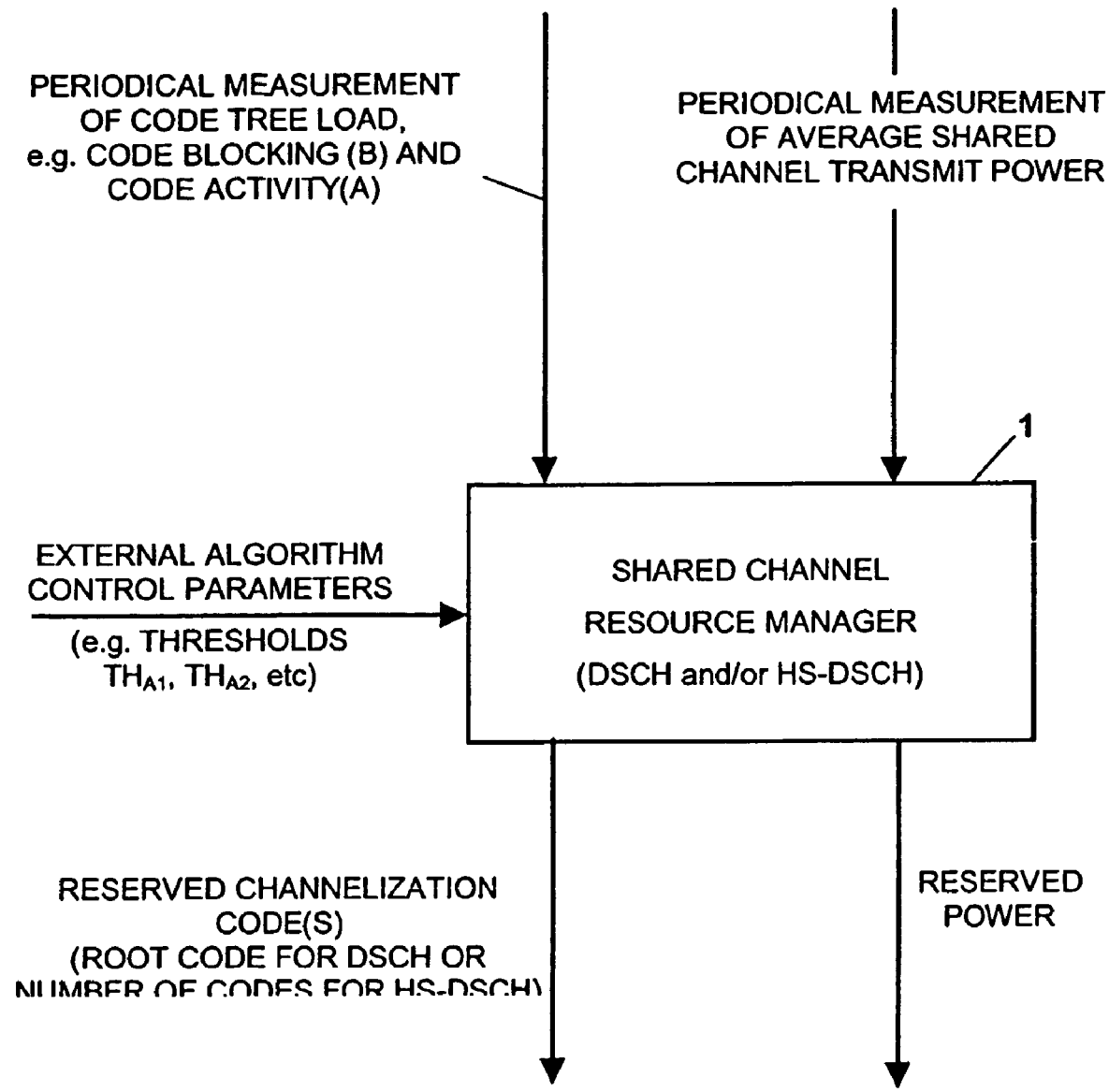
FIG. 6 shows a schematic block diagram illustrating an embodiment of the present invention.

FIG. 6 shows a schematic block diagram illustrating an embodiment of the present invention. A shared channel resource manager 1 (DSCH and/or HS-DSCH) receives several inputs for evaluating and optimizing or improving channel resources and/or power. The shared channel resource manager 1 receives measurement results, i.e. data gained by periodical measurement of code tree load, e.g. code blocking (B) and code activity (A), as well as data gained by periodical measurement of average shared channel transmit power. Further, control parameters, preferably external algorithm control parameters (e.g. thresholds $TH_{A1}$, $TH_{A2}$, etc), are supplied to the channel resource manager 1.

The channel resource manager 1 generates outputs for controlling code reservation and power, e.g. reserved channelization code(s) (root code for DSCH or number of codes for HS-DSCH), and reserved power. The channel resource manager 1 calculates the reservation of channelization code(s) and power in accordance with the above explained principles.

The proposed algorithm runs on cell level.

The present invention for code reservation also applies to the channel type HS-DSCH for the HSDPA concept, where the number of codes with SF=16 is adaptively adjusted, i.e. SF is constant.

The drawings are self-explanatory and represent full disclosure of aspects of preferred embodiments of the invention of their own value, even regarding those features which are not explicitly described in the above description.

While the invention has been described with reference to preferred embodiments, the description is illustrative of the invention and is not to be construed as limiting the invention. Various modifications and applications may occur to those skilled in the art without departing from the scope of the invention as e.g. defined by the appended claims.

The invention claimed is:

1. A method, comprising:
adaptively setting a reservation of channelization codes or an allowed power for a downlink shared channel of a transceiver based on parameters for a minimum allowed spreading factor or an allowed power level;
setting the parameters depending on a traffic load, a total load of a cell and an availability of channelization codes;
measuring an average transmitted power of a physical downlink shared channel;
measuring a relative activity factor of the physical downlink shared channel, the relative activity factor defining the ratio between silence and activity of the physical downlink shared channel during an observation period;
measuring a weighted code blocking rate, the weighted code blocking rate comprising a relative time during an observation period in which a larger bit rate than an actually allocated bit rate could have been allocated to a user equipment according to a link adaptation criteria for controlling the downlink shared channel;
adaptively adjusting at least one of a root spreading factor and the allowed power for the downlink shared channel of the transceiver based on results of the measuring; and
decreasing the allowed power when A is smaller than $TH_{A1}$ and $P_{txDSCHest}$ is smaller than ($P_{txPDSCHallowed}-X$);
wherein A comprises an activity factor of a downlink channel, $TH_{A1}$ comprises a threshold parameter, $P_{txDSCHest}$ comprises an estimated power of the downlink shared channel, $P_{txPDSCHallowed}$ comprises an allowed power for the physical downlink shared channel, and X comprises a preset power value.

2. The method of claim 1, wherein the allowed power is decreased by less than or equal to X.

3. The method of claim 1, further comprising:
allowing higher bit rates, comprising decreasing $SF_{min}$ when B is greater than $TH_B$ and A is greater than $TH_{A2}$;
wherein $SF_{min}$ comprises a minimum spreading factor, B comprises a weighted code-blocking rate, A comprises an activity factor of the downlink channel, and $TH_B$ and $TH_{A2}$ comprise threshold values.

4. The method of claim 1, further comprising:
decreasing a maximum bit rate, comprising increasing $SF_{min}$ when B=zero and $L_{code}$ is greater than $TH_{code}$;
wherein $SF_{min}$ comprises a minimum spreading factor, B comprises a weighted code-blocking rate, $L_{code}$ comprises a current load of a code tree, and $TH_{code}$ comprises a threshold parameter.

5. A method, comprising:
adaptively setting a reservation of channelization codes or an allowed power for a downlink shared channel of a transceiver based on parameters for a minimum allowed spreading factor or an allowed power level;
setting the parameters depending on a traffic load, a total load of a cell, and an availability of channelization codes;
measuring an average transmitted power of a physical downlink shared channel;
measuring a relative activity factor of the physical downlink shared channel, the relative activity factor defining the ratio between silence and activity of the physical downlink shared channel during an observation period;
measuring a weighted code blocking rate, the weighted code blocking rate comprising a relative time during an observation period in which a lamer bit rate than an actually allocated bit rate could have been allocated to a user equipment according to a link adaptation criteria for controlling the downlink shared channel;
adaptively adjusting at least one of a root spreading factor and the allowed power for the downlink shared channel of the transceiver based on results of the measuring; and
increasing the allowed power by X when A is greater than $TH_{A2}$ and $P_{txDSCHest}$ is greater than ($P_{txPDSCHallowed}-X$),
wherein A comprises an activity factor of a downlink channel, $TH_{A2}$ comprises a threshold parameter, $P_{txDSCHest}$ comprises an estimated power of the downlink shared channel, $P_{txPDSCHallowed}$ comprises an allowed power for the physical downlink shared channel, and X comprises a preset power value.

6. The method of claim 5, further comprising:
allowing higher bit rates, comprising decreasing $SF_{min}$ when B is greater than $TH_B$ and A is greater than $TH_{A2}$;
wherein $SF_{min}$ comprises a minimum spreading factor, B comprises a weighted code-blocking rate, A comprises an activity factor of the downlink channel, and $TH_B$ and $TH_{A2}$ comprise threshold values.

7. The method of claim 5, further comprising:
decreasing a maximum bit rate, comprising increasing $SF_{min}$ when B=zero and $L_{code}$ is greater than $TH_{code}$;
wherein $SF_{min}$ comprises a minimum spreading factor, B comprises a weighted code-blocking rate, $L_{code}$ comprises a current load of a code tree, and $TH_{code}$ comprises a threshold parameter.

8. An apparatus, comprising:
a processor configured to control a setter and a measurer;
the setter configured to adaptively set a reservation of channelization codes or an allowed power for a downlink shared channel based on parameters for a minimum allowed spreading factor and an allowed power level;
wherein the parameters depend on a traffic load, a load of a cell, and an availability of channelization codes; and
the measurer configured to measure:
an average transmitted power of a physical downlink shared channel,
a relative activity factor of the physical downlink shared channel, the relative activity factor defining the ratio between silence and activity of the physical downlink shared channel during an observation period, and a weighted code blocking rate, the weighted code blocking rate representing the relative time during an observation period where a larger bit rate than the actually allocated bit rate could have been allocated to a user equipment according to a link adaption criteria for controlling the downlink shared channel; and wherein the setter is further configured to adjust at least one of a root spreading factor and allowed power for the downlink shared channel based on results of the measurement;

wherein the setter is further configured to decrease the allowed power when A is smaller than $TH_{A1}$ and $P_{txDSCHest}$ is smaller than $(P_{txPDSCHallowed} - X)$; and wherein A comprises an activity factor of a downlink channel, $TH_{A1}$ comprises a threshold parameter, $P_{txDSCHest}$ comprises an estimated power of the downlink shared channel, $P_{txPDSCHallowed}$ comprises an allowed power for the physical downlink shared channel, and X comprises a preset power value.

9. The apparatus of claim 8, wherein the allowed power is decreased by less than or equal to X.

10. The apparatus of claim 8, wherein the setter is further configured to:
allow higher bit rates, comprising decreasing $SF_{min}$ when B is greater than $TH_B$ and A is greater than $TH_{A2}$;
wherein $SF_{min}$ comprises a minimum spreading factor, B comprises a weighted code-blocking rate, A comprises an activity factor of the downlink channel, and $TH_B$ and $TH_{A2}$ comprise threshold values.

11. The apparatus of claim 8, wherein the setter is further configured to:
decrease a maximum bit rate, comprising increasing $SF_{min}$ when B=zero and $L_{code}$ is greater than $TH_{code}$;
wherein $SF_{min}$ comprises a minimum spreading factor, B comprises a weighted code-blocking rate, $L_{code}$ comprises a current load of a code tree, and $TH_{code}$ comprises a threshold parameter.

12. An apparatus, comprising:
setting means for adaptively setting a reservation of channelization codes or an allowed power for a downlink shared channel based on parameters for a minimum allowed spreading factor and an allowed power level;
wherein the parameters depend on a traffic load, a load of a cell, and an availability of channelization codes;
measuring means for measuring an average transmitted power of a physical downlink shared channel a relative activity factor of the physical downlink shared channel, the relative activity factor defining the ratio between silence and activity of the physical downlink shared channel during an observation period, and a weighted code blocking rate, the weighted code blocking rate representing the relative time during an observation period where a larger bit rate than the actually allocated bit rate could have been allocated to a user equipment according to a link adaptation criteria for controlling the downlink shared channel;
adjusting means for adjusting a root spreading factor and the allowed power for the downlink shared channel based on the measuring; and
increasing means for increasing the allowed power by X when A is greater than $TH_{A2}$ and $P_{txDSCHest}$ is greater than $(P_{txPDSCHallowed} - X)$;
wherein A comprises an activity factor of a downlink channel, $TH_{A2}$ comprises a threshold parameter, $P_{txDSCHest}$ comprises an estimated power of the downlink shared channel, $P_{txPDSCHallowed}$ comprises an allowed power for the physical downlink shared channel, and X comprises a preset power value.

13. The apparatus of claim 12, further comprising:
bit-rate-adjusting means for allowing higher bit rates, comprising decreasing $SF_{min}$ when B is greater than $TH_B$ and A is greater than $TH_{A2}$;
wherein $SF_{min}$ comprises a minimum spreading factor, B comprises a weighted code-blocking rate, A comprises an activity factor of the downlink channel, and $TH_B$ and $TH_{A2}$ comprise threshold values.

14. The apparatus of claim 12, further comprising:
bit-rate-adjusting means for decreasing a maximum bit rate, comprising increasing $SF_{min}$ when B=zero and $L_{code}$ is greater than $TH_{code}$;
wherein $SF_{min}$ comprises a minimum spreading factor, B comprises a weighted code-blocking rate, $L_{code}$ comprises a current load of a code tree, and $TH_{code}$ comprises a threshold parameter.

15. An apparatus, comprising:
a processor; and
a memory containing instructions to cause the processor to perform the following:
measure an average transmitted power of a physical downlink shared channel;
measure a relative activity factor of the physical downlink shared channel, the relative activity factor defining the ratio between silence and activity of the physical downlink shared channel during an observation period;
measure a weighted code blocking rate, the weighted code blocking rate representing the relative time during an observation period where a larger bit rate than the actually allocated bit rate could have been allocated to a user equipment according to a link adaptation criteria for controlling the downlink shared channel; and
increase the allowed power by X when A is greater than $TH_{A2}$ and $P_{txDSCHest}$ is greater than $(P_{txPDSCHallowed} - X)$; and
wherein A comprises an activity factor of a downlink channel, $TH_{A2}$ comprises a threshold parameter, $P_{txDSCHest}$ comprises an estimated power of the downlink shared channel, $P_{txPDSCHallowed}$ comprises an allowed power for the physical downlink shared channel, and X comprises a preset power value.

16. A computer-readable storage medium, comprising computer-executable components that cause a processor to perform the following:
adaptively setting a reservation of channelization codes or an allowed power for a downlink shared channel of a transceiver based on parameters for a minimum allowed spreading factor or an allowed power level;
setting the parameters depending on a traffic load, a total load of a cell and an availability of channelization codes;
measuring an average transmitted power of a physical downlink shared channel;
measuring a relative activity factor of the physical downlink shared channel, the relative activity factor defining the ratio between silence and activity of the physical downlink shared channel during an observation period;
measuring a weighted code blocking rate, the weighted code blocking rate being defined as the relative time during an observation period where a larger bit rate than the actually allocated bit rate could have been allocated to a user equipment according to a link adaptation criteria for controlling the downlink shared channel; and adaptively adjusting a root spreading factor and the allowed power for the downlink shared channel of the transceiver based on results of the measuring; and decreasing the allowed power when A is smaller than $TH_{A1}$ and $P_{txDSCHest}$ is smaller than $(P_{txpDSCHallowed}-X)$; and wherein A comprises an activity factor of a downlink channel, $TH_{A1}$ comprises a threshold parameter, $P_{txDSCHest}$ comprises an estimated rower of the downlink shared channel, $P_{txPDSCHallowed}$ comprises an allowed power for the physical downlink shared channel, and X comprises a preset power value.

17. The computer-readable storage medium of claim 16, wherein the allowed power is decreased by less than or equal to X.

18. The computer-readable storage medium of claim 16, wherein the processor is caused to further perform:

allowing higher bit rates, comprising decreasing $SF_{min}$ when B is greater than $TH_B$ and A is greater than $TH_{A2}$;

wherein $SF_{min}$ comprises a minimum spreading factor, B comprises a weighted code-blocking rate, A comprises an activity factor of the downlink channel, and $TH_B$ and $TH_{A2}$ comprise threshold values.

19. The computer-readable storage medium of claim 16, wherein the processor is caused to further perform:

decreasing a maximum bit rate, comprising increasing $SF_{min}$ when B=zero and $L_{code}$ is greater than $TH_{code}$;

wherein $SF_{min}$ comprises a minimum spreading factor, B comprises a weighted code-blocking rate, $L_{code}$ comprises a current load of a code tree, and $TH_{code}$ comprises a threshold parameter.

* * * * *

UNITED STATES PATENT AND TRADEMARK OFFICE
CERTIFICATE OF CORRECTION

| | | |
|---|---|---|
| PATENT NO. | : 7,650,154 B2 | Page 1 of 1 |
| APPLICATION NO. | : 10/517448 | |
| DATED | : January 19, 2010 | |
| INVENTOR(S) | : Pedersen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1355 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,650,154 B2 | Page 1 of 1 |
| APPLICATION NO. | : 10/517448 | |
| DATED | : January 19, 2010 | |
| INVENTOR(S) | : Pedersen et al. | |

It is certified that error appears in the above-identified patent and that said Letters Patent is hereby corrected as shown below:

Column 8,

Line 24, "lamer" should read --larger--.

Column 11,

Line 8, "rower" should read --power--.

Signed and Sealed this
Twenty-eighth Day of June, 2011

David J. Kappos
*Director of the United States Patent and Trademark Office*